INVENTOR.
JACK P. GOODMAN
BY Richard D. Law
ATTORNEY 3,403,520
METHOD FOR SETTING POLES
Jack P. Goodman, 4000 Holland St.,
Wheatridge, Colo. 80033
Filed Apr. 17, 1967, Ser. No. 631,482
5 Claims. (Cl. 61—53.5)

ABSTRACT OF THE DISCLOSURE

A method for setting poles forms in ground a hole which is only slightly larger than the butt of the pole to be placed in the hole, places the pole in the hole in the desired position, partially fills the hole with a reaction mixture of a synthetic resin and a blowing agent, and permits the reaction to complete so as to expand and foam the resin into all the space between the pole and the sides of the hole. The expanded resin adheres to and seals the end of the pole, protecting it from moisture, chemicals and rodents and firmly sets the pole in the hole. The expanding resin fills all the voids, crevices and notches, both in the sides and bottom of the hole, as well as the butt of the pole itself.

---

This application is an improvement of my United States patent application Ser. No. 433,292, filed Feb. 17, 1965, for Earth Boring Machines and Method of Setting Poles, now Patent No. 3,344,871.

Utility poles are used throughout the world for holding conductors or wires of one sort or another above the ground. The most commonly used utility pole in the United States is a wooden pole, although others of steel, aluminum, concrete, or the like have been used for various purposes and in various amounts. The conventional method of setting wooden poles is to drill a hole with an auger, place the pole in the hole, balance the pole in its desired position, back-fill the hole with the removed dirt and then tamp the back-fill for supporting the pole in position. This, of course, requires that the hole be large enough to accommodate the pole and yet leave sufficient room around the sides to tamp the back-fill dirt between the pole and the side walls of the hole. Conventionally, very little tamping of the back-fill dirt is accomplished until the void is mostly filled with dirt, thus leaving the bottom back-fill untamped or lightly tamped. The majority of poles used by utility companies are creosote treated, which is a creosote coating over most of the pole, but about a foot or so of the butt end of the pole is not treated due to the pole holding mechanism and the process for the creosote coating. This, of course, leaves an untreated end of the pole which goes underground. In areas of high moisture, or high chemical content of soil, for example alkaline or acid soil, or where rodents and vermin are prevalent, the unprotected butt of the pole is subject to deterioration. This can be quite rapid, requiring very early replacement of the pole. Metal poles have been tried in some instances; however, the metal causes an additional problem due to the electrical conductance of the metal of the pole, both with the carrying of electricity in the wires supported by the pole and electrical disturbances and changes in the atmosphere. Concrete poles, on the other hand, are expensive and normally too heavy to transport for any distance economically, and the handling of such very heavy poles considerably increases the cost of the transmission line.

According to the present invention, I have provided a method of installing poles or posts which includes forming a hole in earth which is only slightly larger than the pole end to be inserted in the hole. The space between the pole and the side of the hole is not sufficient to accommodate tamping tools. The method includes partially filling the void between the post and the side of the hole with an expandible plastic foam material, and letting the reactants complete the reaction to form an expanded plastic, thereby completely filling the void between the pole and the wall of the hole and exerting pressure on the earth around the hole. The composition of the foam may be controlled so as to give the desired strength for securing the pole in its position. Among the advantages of setting the pole or post in this manner include:

(1) The size of the hole formed in the ground may be reduced in diameter, reducing the cost of excavation, and the auger or drill has less chance of encountering rocks or obstructions which otherwise, in many cases, must be removed by hand. Further, in drilling or excavating in rock or hard earth conditions, the smaller diameter hole is easier, faster, and, therefore, more economical to produce.

(2) A tamping operation of back-fill is eliminated, as the material expands to completely fill the void between the pole and the earth side walls and sets up fast so as to secure the pole into the surrounding ground. This saves time, eliminates unnecessary expensive tamping.

(3) The plastic material forms a complete bond between the pole and earth and separates the pole from the surrounding ground, thereby protecting the pole from any deleterious effects of chemicals, moisture, or the like which may be in the ground surrounding the pole.

(4) The plastic material coats the contacted pole portion, expanding into cracks and crevices in the pole and protects the part of the pole underground from attack by small animals or insects. Generally, untreated wooden poles may be used with the invention.

(5) Considerably less total setting time is taken to bore the smaller hole, mix the ingredients, pouring the same into the void between the pole and the side walls, and permitting the plastic to set, thereby reducing the cost, both in equipment and in manpower in the setting of the poles.

(6) The plastic material adheres to the pole itself and does not contract away from the pole, thereby producing a larger amount of solid material at the butt of the pole, producing pressure on the earth around the hole, giving a firmer set in the earth. Normally, the boring of a hole of considerably larger diameter than the pole actually reduces the ground pressure per square inch surrounding the pole, permitting a tendency of the pole to sway in severe wind conditions; the smaller diameter hole maintains the earth pressure adjacent the pole and reduces the tendency of the pole to sway.

(7) The setting of the pole in the hole is safer than inconventional methods as the mixing of the material and pouring the same in the hole is safer than the use of hand or mechanical tamping tools.

(8) The plastic setting material provides a uniform setting of all poles, not dependent upon human actions or subject to the physical work, such as the tamping.

Included among the objects and advantages of the present invention is to provide a method for setting poles and posts in a hole only slightly larger than the butt of the pole or post to be placed therein, without tamping.

Another object of the invention is to provide a means of setting a pole or post in a hole and providing protection for the portion of the pole or post in the ground.

A further object of the invention is to provide an economical and rapid method of setting a post or pole in ground which provides a firm set and protection for the pole portion set in the ground.

These and other objects and advantages of the invention may be ascertained by referring to the following description and appended illustrations in which.

Figure 1:
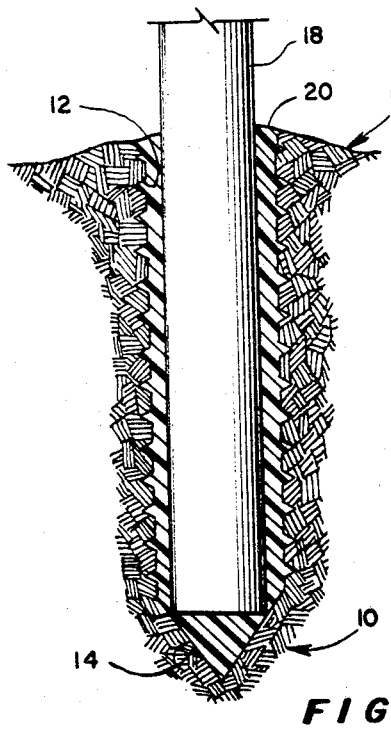
FIG. 1 is a partial cross-sectional view of a portion of ground showing a hole, a pole set therein and an expanded plastic material setting the pole, according to the invention.

In my co-pending application, above identified, there is described a hole forming tool for pressing a hole in ground which involves the forming of the hole by displacing the dirt from the path of the hole into the side walls, thereby compressing the dirt surrounding the side wall of the hole rather than actually augering out dirt from the hole. In loose soils this has the advantage of actually compacting the soil into which the pole is to be set. As shown in FIG. 1, a hole 10 is provided with annular or spiral grooves 12 in the side wall extending from the top down to about the bottom, formed by a device such as illustrated in my co-pending application, above identified. The bottom of the hole 14 is of a conical shape due to the shape of the hole forming tool. The action of forming tool is to displace the soil and compress it into the soil back of the surface of the wall 16 for a distance away from the hole, forming a compressed side wall for the hole. A pole 18 is set in the hole and a liquid resin material with a blowing or forming agent is poured into the void around the pole so that it ultimately expands and forms a foamed plastic or resin filler 20, completely filling the void between the pole and the wall. One very effective synthetic resin useful for the process is polyurethane which has been mixed with a blowing agent which liberates an inert gas during setting of the polyurethane, expanding the same and permitting it to harden in the expanded, cellular form. One foaming agent for the polyurethane is a polyisocyanate, and the chemical reaction is between the poly-ester resin, water and the polyisocyanate is to form a cellular structure by internal carbon dioxide formation and the polymerization or setting of the polyurethane. In certain instances it may be desirable to add an accelerator, for example a tertiary amine, for controlling the action. The density of the set foam is controlled by the amount of water and the amount of polyisocyanate used. It has been found that a 4 pound per cubic foot density of set foamed polyurethane material gives a strength of about 80 pounds per square inch strength, which is ample to secure a pole in position for most installations. The strength of the set resin, of course, may be varied by increasing or decreasing the density by controlling the amount of water and the polyisocyanate.

In the actual process of setting the poles, after the hole has been formed and the pole placed in the hole, the two liquid reaction ingredients are mixed or stirred together for about a minute and the mixture is then poured into the void between the pole and the side wall of the hole. By forming a hole of specific diameter and depth and utilizing a pole having a particular butt diameter, an exact amount of liquid ingredients may be poured together to form, after reaction, a sufficient foam which just fills the void to the top of the earth. The reaction of the mixture in the void takes about a minute or so, and, at the end of the reaction period, the plastic sets solidly enough to provide sufficient strength to support the pole in position. The resin, of course, continues to set and harden over a period of time, depending upon the temperature and ambient conditions, and usually at the end of forty-eight hours, generally has its ultimate strength. By forming the hole in the ground with the spiral grooves, the resin expands into the grooves, expands into the crevices and cracks in the hole and the pole, completely binding the pole into the hole. The spiral grooves provide an added safety feature of insuring that the solid resin is firmly setting the pole in the hole.

Figure 2:
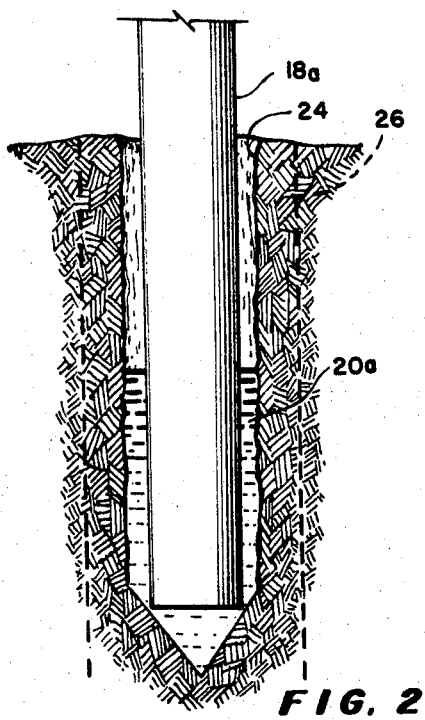
FIG. 2 is a partial cross-sectional view of a hole and surrounding ground with a pole therein, illustrating an initial step in the method of setting a pole in the hole.
Figure 3:
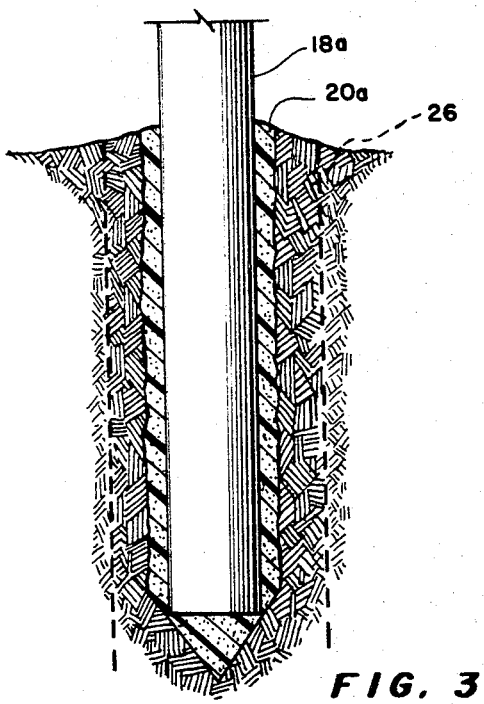
FIG. 3 is another view of the hole of FIG. 2, illustrating a further step in the operation of setting the pole in the hole after the plastic has expanded.

As illustrated in FIG. 2, a hole 24 is bored in the ground, as by an auger, so that there is actually no compression of the dirt into the side wall around the hole, and the dirt 26 surrounding the hole has very little strength. A pole 18a set in the hole is secured in desired upright position and the desired amount of liquid 20a is poured in the hole, after mixing of the two ingredients, as explained above. On completion of the reaction, the resin material has foamed and expanded, filling completely the void and adhering both to the ground and to the pole. In addition, the expansion of the resin slightly enlarges the hole during expansion, compressing the dirt adjacent the wall of the hole, increasing the strength of the ground around the hole. In loose soil, of course, the liquid plastic flows into and around a portion of the soil of the wall of the hole and, on expanding, combines with the soil, further adding strength to the set. The plastic material, furthermore, adheres to the pole, expanding into cracks and crevices on the pole and becomes part of the pole itself. Some dirt or soil may be mixed with the liquid plastic to help fill the void between the pole and the hole, reducing the cost thereof, and, since the plastic expands, the addition of the dirt is not detrimental to the process.

In place of the polyurethane other types of plastics or resins may be used, and these include phenol-aldehyde and urea-aldehyde resins, polystyrene, polyethylene, plasticized polyvinyl chlorides, cellulose acetate, and both natural and synthetic elastomers, etc. The main consideration is generally cost; however, a few pounds of the same is all that is necessary to set a large utility pole. Blowing agents which may be used with the plastics include ammonium compounds and inorganic carbonates, as well as organic blowing compounds which are conventionally used and known in the art of expanded plastics.

As a typical example, a 16" diameter butt pole may be set in an 18" diameter hole about 5 feet deep, using about 7 pounds of liquid polyurethane containing sufficient blowing agent to produce a 4 pound per cubic foot plastic foam. Under most conditions, the expanded resin forms from 80–100 pounds per square inch strength material.

While the invention has been described with reference to particular embodiments, there is no intent to limit the spirit or the scope of the invention to the precise details so set forth except as defined in the following claims.

I claim:

1. A method of installing a pole or the like in earth comprising forming a hole in the earth; said hole being only slightly larger than the diameter of the pole to be set, and when a pole is set therein there is insufficient room for insertion of tamping tools; telescoping the end of the pole in said hole; partially filling the remaining portion of said hole with a liquid resin and a foaming agent; permitting said resin and foaming agent to react, thereby expanding and setting into a foamed resin completely filling the hole around said hole, adhering to said pole and the earth around said hole.

2. A method of installing a pole or the like in earth comprising forming a hole in the earth by displacing soil laterally of the center line of the hole and compacting the same into the wall of the hole, said hole being only slightly larger than the diameter of the pole to be set; telescoping the end of a pole in said hole; filling the void between the wall of said hole and said bore with a foamable and hardenable resin; and permitting said material to set while supporting said pole in a generally upright position.

3. A method of installing a pole or the like in earth comprising forming a hole in the earth by displacing soil radially of the center line of the hole and compacting the same into the wall of the hole; scarifying the wall of the hole to provide an irregular wall, said hole being only slightly larger than the diameter of the pole to be set; telescoping the end of a pole in said hole; and filling the void around the pole in the hole with a foamed and set resin while supporting said pole in a generally upright position.

4. A method according to claim 1 wherein said resin is a polyurethane.

5. A method according to claim 1 wherein said hole is formed by excavation and the resin compresses the wall of the hole on expanding.

References Cited

UNITED STATES PATENTS

| | | | |
|---|---|---|---|
| 2,554,288 | 5/1951 | Ainsley | 52—298 X |
| 2,724,156 | 11/1955 | Shaw | 52—170 X |
| 3,302,410 | 2/1967 | McLean | 61—45 X |

JACOB SHAPIRO, *Primary Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,403,520                                                      October 1, 1968

Jack P. Goodman

It is certified that error appears in the above identified patent and that said Letters Patent are hereby corrected as shown below:

Column 4, line 57, "hole around said hole" should read -- hole around said pole --.

Signed and sealed this 7th day of April 1970.

(SEAL)
Attest:

Edward M. Fletcher, Jr.                                    WILLIAM E. SCHUYLER, JR.

Attesting Officer                                                      Commissioner of Patents